(12) United States Patent
Khrakovsky et al.

(10) Patent No.: US 8,631,636 B2
(45) Date of Patent: Jan. 21, 2014

(54) SHACKLE ASSEMBLY

(75) Inventors: Alex Khrakovsky, Columbus, OH (US); Robert Turner, Circleville, OH (US); Pavel Gvantmakher, Gahanna, OH (US); Reinhold Ost, Offenbach am Main (DE)

(73) Assignee: Tecsis Delta Metrics, Worthington, OH (US)

( * ) Notice: Subject to any disclaimer, the term of this patent is extended or adjusted under 35 U.S.C. 154(b) by 0 days.

(21) Appl. No.: 13/597,077

(22) Filed: Aug. 28, 2012

(65) Prior Publication Data

US 2013/0067881 A1     Mar. 21, 2013

Related U.S. Application Data

(60) Provisional application No. 61/536,471, filed on Sep. 19, 2011.

(51) Int. Cl.
*F16G 15/06*     (2006.01)
*B66C 1/34*     (2006.01)

(52) U.S. Cl.
USPC ........................ 59/86; 59/78; 59/85

(58) Field of Classification Search
USPC .............. 59/78, 86, 93; 73/862.391, 862.632, 73/862.635, 828
See application file for complete search history.

(56) References Cited

U.S. PATENT DOCUMENTS

| | | | | |
|---|---|---|---|---|
| 4,977,783 | A * | 12/1990 | Pratt | 73/862.392 |
| 5,224,388 | A * | 7/1993 | Pratt | 73/862.632 |
| 6,774,320 | B2 * | 8/2004 | Simons | 73/862.635 |
| 7,418,875 | B2 * | 9/2008 | Kohno et al. | 73/862.391 |
| 8,171,715 | B2 * | 5/2012 | Segura | 59/86 |
| 2004/0237662 | A1 * | 12/2004 | Nassar et al. | 73/828 |

* cited by examiner

*Primary Examiner* — David B Jones
(74) *Attorney, Agent, or Firm* — Baker & Hostetler LLP

(57) ABSTRACT

A shackle assembly includes a shackle body having two shackle arms extending from a bridge portion which is fixed to the two arms and connects the two arms to each other. A shackle pin can be mounted to the shackle arms and connects the two shackle arms in the mounted state. At least one pocket is formed in at least one of the shackle arms and/or the shackle pin, in which pocket a strain sensing element is received and fixedly attached to the bottom or wall of the pocket for detecting a shackle load acting on the shackle assembly. The pocket is a hole going partially through the shackle arm or going partially through the shackle pin, and the strain sensing element is a strain gauge which is attached to the wall or bottom of the hole.

24 Claims, 3 Drawing Sheets

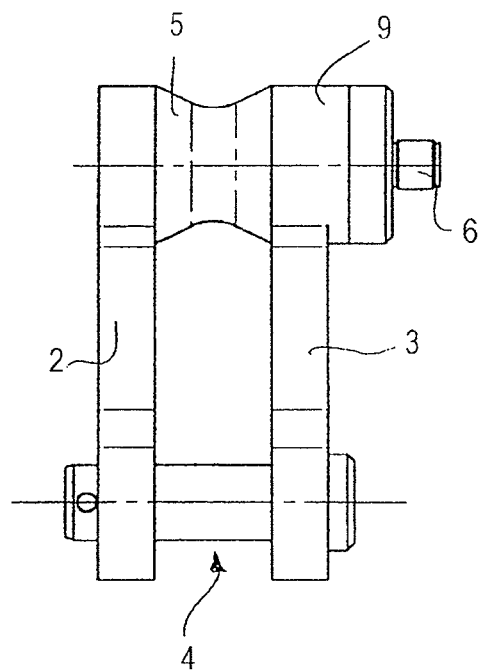
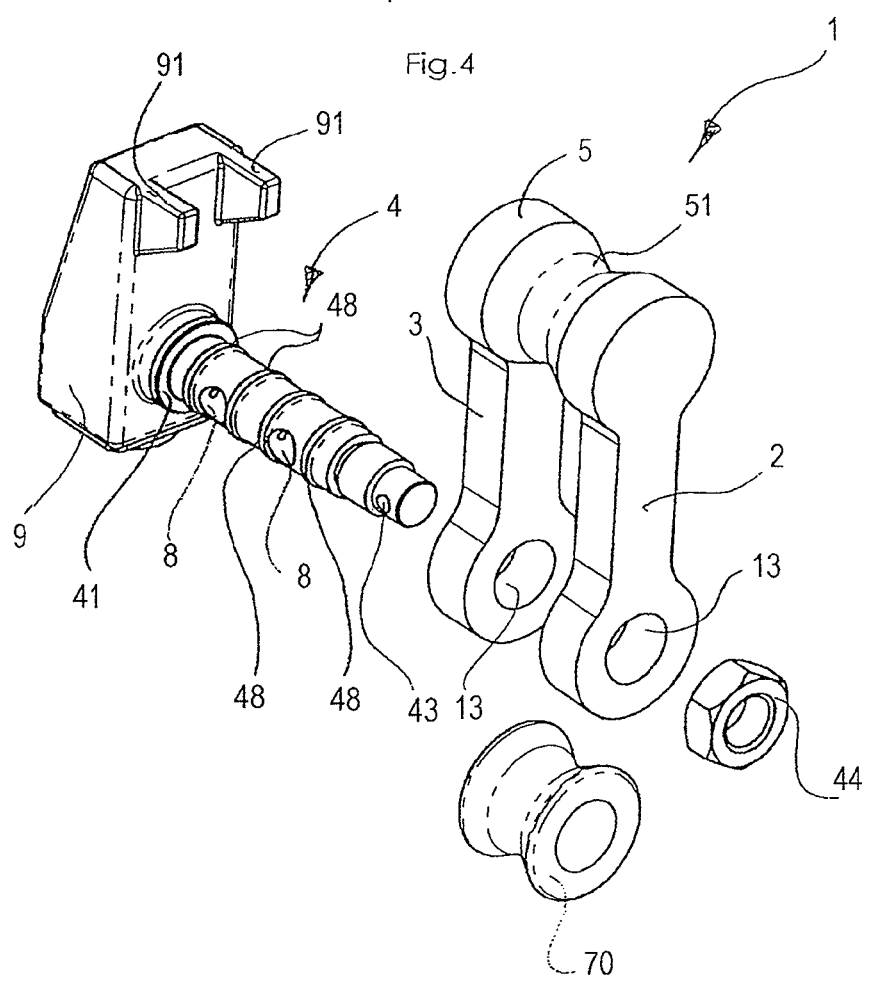

SHACKLE ASSEMBLY

CROSS-REFERENCE TO RELATED APPLICATION

This application claims priority to U.S. provisional patent application No. 61/536,471, filed on Sep. 19, 2011, the disclosure of which is incorporated by reference in its entirety.

FIELD OF THE INVENTION

The present invention relates to a shackle assembly.

BACKGROUND

Shackle assemblies are elements used for connecting chains or wires in various load applications. Typically, a shackle assembly or shackle has a set of shackle arms which are connected to each other at one end by a bridge portion, so that a substantially U-shaped shackle body is obtained, which is open at the end opposite to the bridge portion. This shackle body can be closed with a shackle pin, which is typically received in openings in the shackle arms. One of the openings as well as one end of the shackle pin can be provided with a thread, so as to hold the shackle pin in its position, when threaded into the shackle body.

Shackles are used in situations where large loads or pulling forces are applied to ropes, chains, etc. For safety reasons, it is of great benefit to provide a load measuring function to the shackle assembly to monitor the applied loads, and to stop loading/pulling if the forces applied to the shackle assembly exceed a maximum load which has been set as a safety value.

One known shackle assembly (an off-the-shelf-product) is provided with a strain gauge attached to the shackle body, at portions which exhibit the most bending deformation when the load is applied. The load applied to the shackle assembly can be derived from the strain gauge signals. In practice, the strain gauge is applied to the outer surface of the shackle body. A plastic cover is provided to protect the strain gauge against ambient conditions and shocks.

The inventors have found that with standard parts, the accuracy of the measurement of the forces applied to the shackle assembly can be less than desirable. Additionally, the known shackle assembly suffers from the problem that the strain gauge is easily damaged, requiring exchange of the shackle assembly.

SUMMARY OF THE INVENTION

Using standard shackle assemblies in the manner described above, it was found that extraordinary calibration is required for each shackle assembly provided with a strain gauge. Small positioning inaccuracies of the physical parts which may occur during normal shackle use have a considerable impact on the response curve of the strain gauge with respect to the load applied. Furthermore, the standard shackle is usually a forged product, in which dimensions are not very accurate which also degrades accuracy when measuring the load applied.

It was found that the arrangement of the strain gauge at the aforementioned positions of the known shackle assembly is influenced by the application direction of the load, because an inclined pulling force direction may cause an additional/reduced deformation at the position of the shackle body where the strain gauge is situated.

It was found that the dimensional accuracy has a significant impact on the response curve of the load sensing element to a load applied to the shackle; for example, when forged or drop forged manufacturing processes are applied.

In view of the above, a load-measuring shackle assembly is provided that advantageously improves the accuracy of measured loads while being sturdy in operation.

In one embodiment, the shackle assembly includes a shackle body having two shackle arms extending from a bridge portion which is fixed to the two arms and connects the two arms to each other, a shackle pin which can be inserted into the shackle arms and connects the two shackle arms in the mounted state, and at least one pocket, formed in one or both of the shackle arms and/or in the shackle pin, in which pocket a strain sensing element is received and fixedly attached to the bottom or wall of the pocket for detecting a shackle load acting on said shackle assembly.

The strain sensing element is received in the pocket and is fixed therein. This affords many advantages. For example, the strain sensing element can be securely protected against ambient conditions and damage. Additionally, by controlling not only the position of the pocket on the shackle arm and/or the shackle pin, but also the position of the strain sensing element within the pocket, measurement accuracy is improved.

Preferably, there are provided two pockets in the shackle assembly. In this case, one of the pockets is provided in each one of the shackle arms; alternatively, the two pockets are provided in the shackle pin. Using the similarity of the response of the strain sensing elements due to the similarity of the shape of the two shackle arms, a sum of the measured results can be obtained. Similarly, when the shackle pin is equipped with two strain sensing elements in two pockets, then a summing circuit is simple to construct. Besides, in the above arrangements, sensor redundancy can also be achieved.

Preferably, the pocket is a hole going partially or fully through the shackle arm or going partially or fully through the shackle pin, and the strain sensing element, e.g., a strain gauge, is attached to the wall or bottom formed by the pocket. The hole or pocket can be formed by drilling or other cutting methods, but it can also be formed during the investment casting of the shackle assembly parts.

In another embodiment, the strain sensing element is a metal plate carrying strain detectors that has a circumference that comports with the inner surface of the hole. The metal plate can be welded to the inner surface or wall of the hole so as to close the hole. This type of strain sensing element produces accurate data, and the weld is reliable, uncomplicated and does not degrade over time.

Preferably, the strain detectors on the metal plate are formed by sputtering and may be covered by impermeable materials, including glass or plastics, to protect against various environmental elements, such as, for example, corrosive conditions like seawater, etc.

To improve the accuracy of the measured load, the strain sensing element or the shackle assembly can include a temperature sensing means for measuring ambient temperature, which can be used to compensate the measured shackle load relative to changes in ambient or internal temperatures. Usually, strain is measured by sensing changes in the electrical resistance of resistors arranged in a wheatstone bridge-type electrical circuit, and the output of the strain sensing resistors is more accurate, if the temperature influence on the values of the resistors is included, i.e. temperature compensation is made.

There may be one or more additional strain sensing elements provided within the pocket to provide redundancy in case of failure.

With respect to the shape of the shackle body, the pocket may be circular in shape, or the pocket may be a circular hole combined with an elongated extension thereof in the form of a slit, which extends to the bridge portion of the shackle. With respect to the shackle pin, the pocket may be connected to a channel which extends along a main axis direction of the shackle pin in the form of e.g. an axial extending hole or bore.

Advantageously, the deformation behavior or stiffness of the shackle body can be influenced or controlled by lengthening or shortening the shape of the pocket. Additionally, wiring for the strain sensing element may be placed in the slit that extends to the bridge portion, and embedded or fixed with an elastic material such as, for example, a synthetic rubber or similar material. In this way, the wiring can be well protected against damage. In the case of the pocket being formed in the shackle pin, the channel may be adapted to control or set deformation behavior of the shackle pin and may—if desired—receive and hold the wiring of the strain sensing element in a well protected way.

Preferably, the wiring extends between the strain sensing element and an evaluation unit or an electrical circuit for amplifying or converting the relatively low signal levels generated by the strain sensing element to a higher level or different type of signal indicative of the load acting on the shackle from the electric signals of the strain sensing element.

In a preferred embodiment, the shackle arms have a rectangular cross-sectional shape, and the calculation of the load values from the strain measured by the strain sensing elements is less complex due to this simplified geometry. The shackle pin, preferably, has a cylindrical shape. Preferably, when the strain sensing element is located in the shackle pin the shackle assembly is provided with a means for guiding and holding the shackle pin in a defined rotational position with respect to the shackle body, when the shackle is closed. In this way, inadvertent loading of the shackle pin in an area in which the sensing pocket is situated, can be avoided. Alternatively, an additional load distribution element (basically in the shape of a roller) may be slid over the shackle pin, so as to distribute the load on the shackle pin to avoid undesirable loading conditions that can e.g. occur if the load is not centered between the shackle arms.

Preferably, the shackle assembly includes a housing for receiving electrical connectors and/or an evaluation unit or an amplifier circuit which may be provided on the shackle body or on the shackle pin. The housing may be provided on the bridge portion and/or on at least one of the shackle arms, and may formed in one piece with the shackle body. The housing may be provided on an axial end portion of the shackle pin, and preferably, electrical connectors are provided for plug contact established by axial or perpendicular plug in of contact plugs. Preferably, the electrical connection to the evaluation unit or amplifier circuit can positively indicate the proper installation by using a feedback element for the pin. The feedback element combines an electric connector and a fixing or securing element to ensure the pin was installed properly. In such an arrangement, monitoring of the load then includes the information whether the pin is secured or not.

Preferably, the housing accommodates at least one of one or more of an evaluation unit or amplifier circuits for increasing or converting the strain sensing element signals, connecting means for connecting the evaluation unit or amplifier circuit to external cable or display device, a wireless transmitting means for transmitting strain sensing element signals and/or signals from the evaluation device to an external transmitter, and a recording means for recording load values and/or loaded time periods. The connecting means may be one half of a preferably waterproof electrical plug/socket-connection to be connected to with a corresponding other half of an electrical plug/socket-connection of an electric cable like, e.g. a helix cable.

Preferably, the shackle body may be formed by an investment casting process using stainless steel. The stainless steel may be of Type 17-4 or other suitable material, and may preferably have a hardness of h900 or other suitable hardness. In this investment casting method, one or more wax models of the shackle are formed, for example, by wax casting or the like. These wax models are packed into a ceramic and/or sand cover. The ceramic/sand material is fired to form the casting mold (the wax material was removed during the firing step so that the form nest inside the casting mold gives the intended shape to the steel cast into the mold). After casting and adequate cooling the molten steel, the casting mold is broken to remove the shackle. One or more tempering, sanding, etc., steps may be provided. Investment casting is a very accurate manufacturing method that allows the reliably repeatable creation of metal parts having complex shapes.

BRIEF DESCRIPTION OF THE DRAWINGS

FIG. 3 shows a plan view on the embodiment of the shackle assembly of FIG. 2;

FIG. 4 depicts a schematic perspective view of a shackle assembly in accordance with a second embodiment of the present invention;

DETAILED DESCRIPTION

Figure 1:
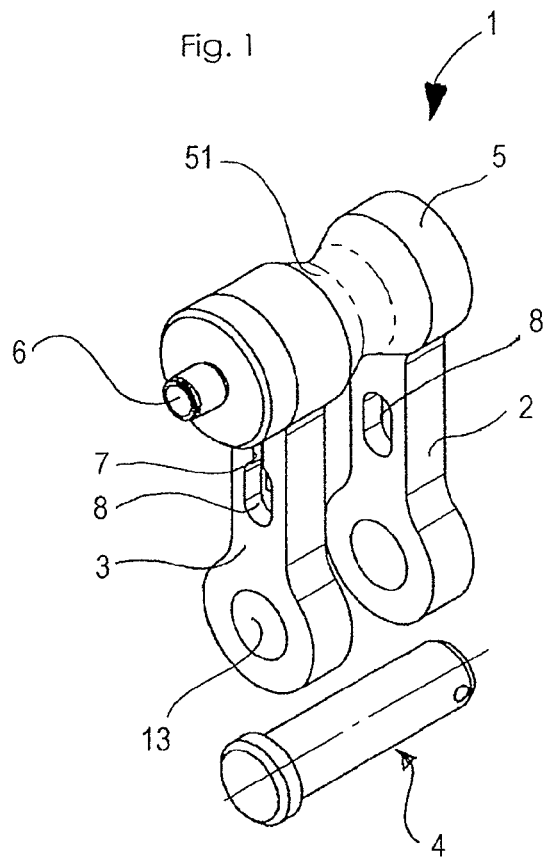
FIG. 1 depicts a schematic perspective view of a shackle assembly in accordance with a first embodiment of the present invention.
Figure 2:
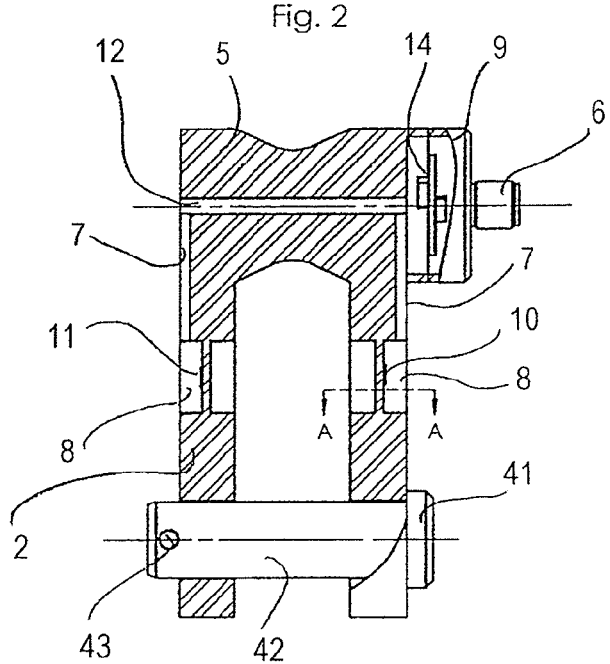
FIG. 2 shows a sectional view of the embodiment of the shackle assembly of FIG. 1, wherein the shackle pin is in mounted condition.

The first embodiment of a shackle assembly in which a strain sensing elements are provided in the shackle arms is shown in FIGS. 1 to 3. According to FIG. 1, the shackle body 1 includes shackle arms 2 and 3 and a bridge portion 5 which connects the shackle arms 2, 3 in a rigid manner. Each shackle arm 2, 3 has a pocket 8 formed therein which forms a cavity for accommodating one or more strain sensing element(s) (not shown for clarity), and further has a hole 13 for receiving a shackle pin 4. In the shackle arm 3 there is shown a slit 7 which extends from the pocket 8 in the direction of the bridge portion 5 of the shackle body 1. The bridge portion 5 has a reduction of outer diameter in its middle portion 51, so that a ring, a thimble or a chain link is guided into a load bearing position when load is applied to the shackle assembly. The bridge portion may also be described as having a shape of a spool which is formed by two truncated cones which are connected to each other at their tip. In this way, a circumferentially extending groove is formed around the bridge portion. It is noted that the groove may be rounded or smoothly formed. Here, the load bearing position is in the middle between the two shackle arms for a symmetrical load distribution on the shackle arms 2, 3.

The shackle body 1 further carries a housing 9 in the vicinity of the bridge portion 5 from which housing 9 a connecting portion 6 for an electric connection extends sideways away from the housing 9. The housing 6 has a circular shape so as to match with the outer shape of the bridge portion 5 at side of the arm 3. In this way, it is avoided that the housing 9 extends from the shackle in its lengthwise direction, i.e. in the load bearing direction when in use. Thus, a certain protection of the housing 9 with respect to shock applied in the shackle lengthwise direction is obtained.

FIG. 2 shows a sectional view of the shackle assembly of FIG. 1. The same reference signs depict the same elements. As can be seen in addition to the presentation of FIG. 1, inside the pockets 8 in each of the shackle arms 2, 3 there is provided a strain sensing element 10, 11. These strain sensing elements 10, 11 are arranged on a plate shaped portion closing the pocket with a thin plate, so that the pockets are closed and do not form a through hole penetrating the respective shackle arm 2, 3. The plate shaped portions may also be a part of the strain sensing element for mounting in a through hole in the arm. In this case, the thin plate is formed with sensing structures (pattern of resistors) formed on the thin plate by sputtering. Such prefabricated strain sensing elements can then be welded into the pockets wherein a circumferential weld (not shown in FIG. 2) securely holds the respective strain sensing element durably in a defined force/deformation transmitting contact with the shackle arm. In the strain sensing elements, a glass or plastic cover (not shown) protects the sputtered resistors.

Reference sign 7 indicates a slit in the respective shackle arm. Each pocket 8 is connected to a respective slit 7. The slits are connected to a channel 12 which is provided as a through hole passing through the bridge portion 5 of the shackle body 1. The channel 12 opens to the inside of the housing 9. Inside housing 9 there is an amplifier circuit 14 which is only indicated schematically as a circuit board with electronic parts thereon. Wiring (not shown) which connects the individual strain sensing elements 11 and 12 to the evaluation unit 14 is positioned in the slits 7 formed in the side surfaces of the shackle arms 2, 3. The slit 7 of shackle arm 2 (left arm in FIG. 2) is connected to the channel 12. The wiring (not shown) connecting strain sensing element 11 to amplifier circuit 14 is passed through the channel. The wiring (not shown) of sensing element 10 is lead into the housing 9 using slit 7 which opens to the inside of housing 9.

The amplifier circuit 14 is electrically connected to connection portion 6 which allows electric plug connection by suitable connecting means (not shown) in order to output signals representative for the measured strain or the calculated load. Connection portion 6 is useful for e.g. power supply to amplifier circuit or calibration of amplifier circuit.

At the lower end of FIG. 2 there is shown the shackle pin 4 which is inserted to and passes through the two shackle arms 2 and 3 by way of holes 13 provided in the arms. The shackle pin 4 has a head portion 41 having a diameter larger than the diameter of holes 13, a locking portion 43 at the end of the shackle pin 4 which is opposite to the head portion 41, and a load portion 42 which extends between the head portion 41 and the locking portion 43, at which load portion a ring, thimble, or chain link is received. The locking portion 43 is shown as a through hole extending crosswise (crossing the longitudinal axis of the cylindrical pin) through the shackle pin 4. Into this hole, a cotter pin or similar securing element (not shown) may be inserted to secure the shackle pin in its position. It is noted that this solution allows using the shackle pin inserted from either side. Alternatively (not shown), the locking portion of the shackle pin typically has threaded portion which co-operates with a thread in one of the holes 13 to fix shackle bolt 4 in its operating position. A cotter pin may be used in addition.

Finally, FIG. 3 shows the shackle in a plan view. It can be seen that housing 9 is made flush with the adjourning bridge portion 5 of the shackle assembly. This is not only improved design and compact. It also avoids unnecessary projections out from the footprint of the shackle, so that it is less likely that the shackle gets entangled, for example, with lifting gear.

FIG. 4 depicts a schematic perspective view of a shackle assembly in accordance with a second embodiment of the present invention. It is noted that the same reference signs are used for the elements which are functionally the same as the corresponding elements described above with reference to FIGS. 1 to 3. Accordingly, the description of these elements applies here in analogous manner.

The shackle assembly of FIG. 4 has a shackle body 1 having two shackle arms 2 and 3 which are, at one end thereof, rigidly connected to each other by a bridge portion 5. The bridge portion 5 has a reduced diameter portion 51 for guiding the load application element, like a ring, a thimble, a chain link or the like into a central position at the bridge portion 5. At the end opposite to the bridge portion, receiving holes 13 are provided which holes are arranged for receiving a shackle pin 4 in a load bearing manner. The shackle arms have a rectangular cross-section, but here any other shape may be used in this embodiment because the load measurement is conducted by way of signals obtained in the shackle pin 4 as will be explained later.

Shackle pin 4 is a load measuring pin which has pockets 8 for receiving strain sensing elements (not shown) therein. A housing 9 is provided at a head portion 41 of the shackle pin 4, and an amplifier circuit (not shown) is received in the housing 9. The housing 9 has projections 91 which extend from the housing 9 in a direction corresponding to the extension direction of the shackle pin 4. In other words, the projections 91 and the shackle pin 4 extend from the housing 9 in parallel with the longitudinal axes thereof being offset relative to each other. The projections 91 define a gap between them, wherein the width of the gap is slightly larger than the width of shackle arm 3 at a portion where the arm is located between the projections 91 when the shackle pin 4 is in its locked position. By way of the engagement between the projections 91 and the shackle arm 3, rotation of the shackle pin 4 around its longitudinal axis is avoided.

FIG. 4 further shows a nut 44 adapted to be screwed on the shackle pin 4 when it is set into holes 13 to close the shackle. A suitable threaded portion (see FIG. 5) is formed at the locking portion end of the shackle pin 4. A locking portion 43 is provided similar to the shackle pin of the first embodiment through which e.g. a cotter-pin (not shown) may be passed for securing the shackle pin 4 to the shackle body 1.

Reference sign 70 indicates a load distribution element, which basically has the shape of a roller or a spool, having a hole in its center through which the shackle pin 4 is passed. Around the circumference of the shackle pin 4, there are formed beads (ring-shaped protrusions) 48 on which the load distribution element 70 rest when in use. The beads and the load distribution element 70 cooperate to apply the load on portions of the shackle pin 4 in which the pockets 8 are present. Therefore, irrespective which type and size of load application element (ring, thimble, chain link, rope or the like) is used with the shackle, a defined loading of the shackle pin is achieved. As a result, a reproducible load measurement is obtained. Furthermore, by setting the axial distance between the individual beads 48, the bending behavior—and thus the response of the shackle pin—can be controlled.

Figure 5:
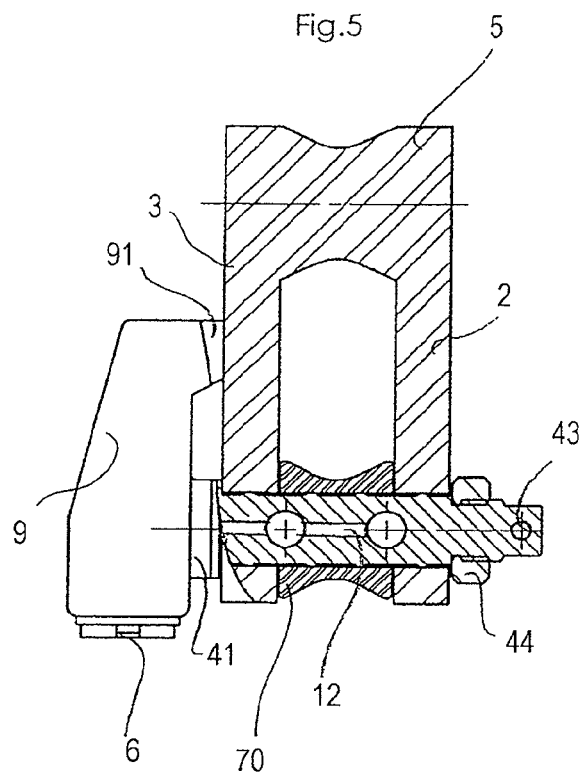
FIG. 5 shows a sectional view of the embodiment of the shackle assembly of FIG. 4, wherein the shackle pin is in mounted condition.

FIG. 5 shows a sectional view of the shackle of FIG. 4 in assembled condition. Reference sign 12 indicates a channel axially penetrating into the shackle pin 4 and opening to the pockets 8 as well as to the inside of housing 9. When the shackle pin 4 is equipped with strain sensing elements (not shown) located in the pockets 8, the wiring of the strain sensing elements passes through that channel 12 to connect the sensing elements to an amplifier circuit (not shown) arranged in the housing 9. In this connection, it is noted that the details of arranging the strain sensing elements in the pockets 8 as well as details of the arrangement and operation of the amplifier circuit as were described for the first embodiment apply here as well. This part of the above description applies here mutate mutandis.

FIG. 5 further indicates an electric connection portion 6 at which electric connection by way of e.g. plug connectors can be made to connect to the amplifier circuit in the housing 9. Electrical connection as well the cooperation of the amplifier circuit with external devices are the same as described with regard to the first embodiment. As can be see in FIG. 5 one of the projections 91 is shown situated behind the shackle arm 3, while the other projection 91 is situated in front of the shackle arm 3 (see FIG. 6). In this way, rotation of the housing 9 relative to the shackle body 1 is restricted, so that the electric connection to the connection portion 6 is protected.

Figure 6:
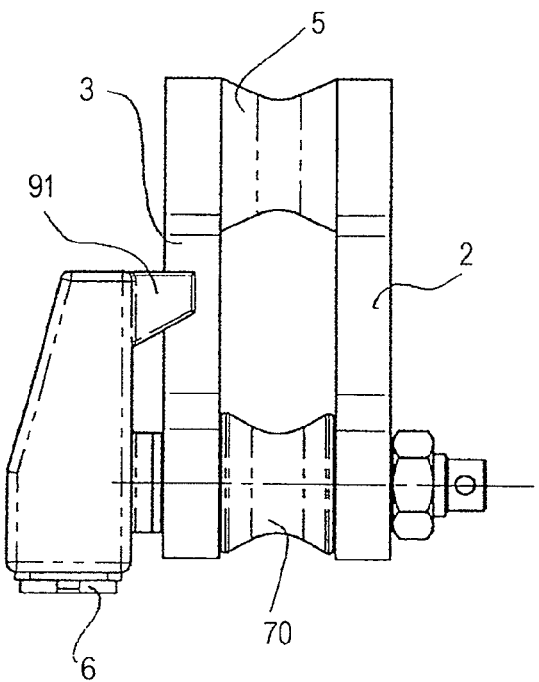
FIG. 6 shows a plan view on the embodiment of the shackle assembly of FIG. 4.

In FIG. 6 there is shown a plan view on the assembled shackle assembly. As can be seen from this drawing, the shape of the housing 9 is made to approach the shackle body and from which housing the projections 91 extend to grasp or engage one of the shackle arms. This design reduces the danger of the shackle getting entangled with e.g. lifting gear.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

The invention claimed is:

1. A shackle assembly comprising:
a shackle body having two shackle arms extending from a bridge portion which is fixed to the two arms and connects the two arms to each other;
a shackle pin which can be mounted to the shackle arms and connects the two shackle arms in a mounted state, wherein at least one pocket having a pocket wall is formed in at least one of the shackle arms and/or the shackle pin; and
a strain sensing element comprising a metal plate carrying strain detectors, wherein the strain sensing element is received in the pocket and welded to the pocket wall for detecting a shackle load acting on the shackle assembly.

2. A shackle assembly according to claim 1, wherein the pocket is a hole going through at least one of the shackle arms or going through the shackle pin, and wherein the metal plate of the strain sensing element has a circumference in a shape of the hole, and is welded to a wall of the hole so as to close the hole.

3. A shackle assembly according to claim 1, wherein the strain detectors on the metal plate are formed by sputtering.

4. A shackle assembly according to claim 1, wherein the strain sensing element or the shackle assembly is provided with a temperature sensing means for compensating ambient temperature effects on the measured shackle load.

5. A shackle assembly according to claim 1, wherein the hole is a circular pocket or an elongated pocket having an extension in the form of a slit, the slit extending to the bridge portion of the shackle.

6. A shackle assembly according to claim 1, wherein the bridge portion or the shackle pin is penetrated by a channel which is open to at least one of the pockets and/or at least one slit.

7. A shackle assembly according to claim 5, wherein the slit and/or the channel is adapted to receive electric wiring, the wiring extending between the strain sensing element and an amplifier circuit for generating measurement values indicative of the load acting on the shackle from the electric signals of the strain sensing element.

8. A shackle assembly according to claim 6, wherein the slit and/or the channel is adapted to receive electric wiring, the wiring extending between the strain sensing element and an amplifier circuit for generating measurement values indicative of the load acting on the shackle from the electric signals of the strain sensing element.

9. A shackle assembly according to claim 1 wherein the shackle arms have a substantially rectangular cross-sectional shape.

10. A shackle assembly according to claim 7, wherein a housing for receiving electrical connectors and/or the amplifier circuit is provided on the shackle body or the shackle pin, and wherein the housing is provided with rotation restricting means restricting rotation of the housing relative to and by engagement with the bridge portion and/or at least one of the shackle arms.

11. A shackle assembly according to claim 10, wherein the housing is formed in one piece with the shackle body.

12. A shackle assembly according to claim 1, wherein at least the shackle body is formed in an investment casting process.

13. A shackle according to claim 12, wherein the shackle assembly is made from cast stainless steel including the stainless steel Type 17-4 or other suitable material having a hardness of h900.

14. A shackle assembly according to claim 10, wherein the housing accommodates at least one of an amplifier circuit for increasing or converting strain sensing element signals, connecting means for connecting the amplifier circuit to external cable or device, a wireless transmitting means for transmitting strain sensing element signals and/or signals from the amplifier circuit to an external transmitter, and a recording means for recording load values and/or loaded time periods.

15. A shackle assembly according to claim 14, wherein the connecting means is one half of a preferably waterproof electrical plug/socket-connection to be connected to with a corresponding other half of an electrical plug/socket-connection of an elastic cable.

16. A shackle assembly according to claim 10, wherein the connecting means is one half of a preferably waterproof electrical plug/socket-connection to be connected to with a corresponding other half of an electrical plug/socket-connection of an elastic cable.

17. A shackle assembly according to claim 10, wherein the housing is provided on the shackle pin and comprises at least two projections extending towards a shackle arm and receiving the shackle arm between the projections to restrict rotation of the housing and the shackle pin relatively to the shackle arm when the shackle pin is mounted.

18. A shackle assembly according to claim 14, wherein the housing is provided on the shackle pin and comprises at least two projections extending towards a shackle arm and receiving the shackle arm between the projections to restrict rotation of the housing and the shackle pin relatively to the shackle arm when the shackle pin is mounted.

19. A shackle assembly according to claim 15, wherein the housing is provided on the shackle pin and comprises at least two projections extending towards a shackle arm and receiving the shackle arm between the projections to restrict rotation of the housing and the shackle pin relatively to the shackle arm when the shackle pin is mounted.

20. A shackle assembly according to claim 1, wherein the shackle pin carries a load distribution element having the shape of a spool with a central hole and a circumferential diameter reduction in the central part.

21. A shackle assembly according to claim 20, wherein the shackle pin has at least two beads between which a pocket is formed and which beads are adapted to cooperate with the wall of the central hole of the load distribution element.

22. A shackle assembly according to claim 1, wherein the shackle pin has at least two beads between which a pocket is formed and which beads are adapted to cooperate with the wall of the central hole of the load distribution element.

23. A shackle assembly according to claim 1, wherein each shackle arm is provided with at least one strain sensing element or in which the shackle pin is provided with at least two strain sensing elements arranged in different pockets.

24. A shackle assembly according to claim 23, further comprising an evaluation unit adapted to calculate load values which compensate inclined loading of the shackle assembly by comparing and/or averaging the load-indicative signals from the strain gauges.

* * * * *